United States Patent
Nicksic et al.

(10) Patent No.: US 7,299,106 B1
(45) Date of Patent: Nov. 20, 2007

(54) METHOD AND APPARATUS FOR SCHEDULING METROLOGY BASED ON A JEOPARDY COUNT

(75) Inventors: Cabe W. Nicksic, Austin, TX (US); Matthew A. Purdy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/109,298

(22) Filed: Apr. 19, 2005

(51) Int. Cl.
*G06F 19/00* (2006.01)

(52) U.S. Cl. ................ 700/121; 700/108; 702/183

(58) Field of Classification Search ........ 700/121, 700/108–110, 117; 702/183–184, 83–84
See application file for complete search history.

(56) References Cited

U.S. PATENT DOCUMENTS

| | | | |
|---|---|---|---|
| 6,577,972 B2 * | 6/2003 | Yanaru et al. | 702/83 |
| 6,684,124 B2 * | 1/2004 | Schedel et al. | 700/121 |
| 7,016,750 B2 * | 3/2006 | Steinkirchner et al. | 700/103 |
| 7,089,075 B2 * | 8/2006 | Hasan | 700/121 |
| 2006/0195215 A1 * | 8/2006 | Suzuki et al. | 700/109 |

* cited by examiner

*Primary Examiner*—Zoila Cabrera
(74) *Attorney, Agent, or Firm*—Williams, Morgan & Amerson

(57) ABSTRACT

The present invention provides a method that includes determining a jeopardy count associated with at least one processing tool and selecting at least one wafer based upon the jeopardy count, the at least one wafer having been processed by the at least one processing tool.

23 Claims, 4 Drawing Sheets

| JEOPARDY QUEUE | |
|---|---|
| WAFER | MT |
| LITH-10 | 1 |
| LITH-10 | 2 |
| PLAN-8 | 2 |
| FURN-1 | 1 |
| PLAN-7 | 2 |
| FURN-2 | 1 |
| ... | |

Figure 5

| FIFO QUEUE | |
|---|---|
| WAFER | MT |
| FURN-1 | 1 |
| LITH-1 | 1 |
| LITH-1 | 2 |
| PLAN-1 | 2 |
| PLAN-3 | 2 |
| FURN-2 | 1 |
| ... | |
| PLAN-8 | 2 |
| LITH-10 | 1 |

Figure 2

METHOD AND APPARATUS FOR SCHEDULING METROLOGY BASED ON A JEOPARDY COUNT

BACKGROUND OF THE INVENTION

1. Field of the Invention

This invention relates generally to the field of semiconductor device manufacturing and, more particularly, to a method and apparatus for scheduling metrology based on a jeopardy count.

2. Description of the Related Art

To fabricate a semiconductor device, a wafer is typically processed through numerous processing tools in a predetermined sequence. The processing tools may include photolithography steppers, etch tools, deposition tools, polishing tools, rapid thermal anneal tools, ion implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, advanced process control (APC) systems are often used to coordinate operation of the processing tools.

Processed wafers are provided to metrology tools at various stages of the processing. The metrology tools perform measurements on the processed wafers and the measured parameters may be used to determine to assess the condition of the processing tools, among other things. If the measurement parameters are within predetermined tolerances, then it is generally assumed that the tools used to process of the wafer are functioning in a desired and/or expected manner. For example, a wafer that has been processed in a deposition tool to form a layer on the wafer (or above another layer or other features formed on the wafer) may be provided to an ellipsometer to determine a thickness of the layer. If the ellipsometer determines that the thickness of the layer formed by the deposition tool is within a tolerance of a desired and/or expected thickness, the ellipsometer is generally assumed to be functioning in a desired and/or expected manner. If the measurement parameters are outside the predetermined tolerances, then the tools may not be functioning in the desired and/or expected manner.

Conventional semiconductor processing systems often include many more processing tools than metrology tools. Consequently, only a portion of the processed wafers may be provided to a metrology tool and the processed wafers that are provided to a metrology tool may be forced to wait in a queue, such as a first-in-first-out (FIFO) queue, before being provided to the metrology tool. The discrepancy between the (relatively fast) rate at which wafers may be processed in processing tools and the (relatively slow) rate at which wafers may be provided to metrology tools for analysis may result in wafers being processed in processing tools that may not be functioning in a desired and/or expected manner. For example, a processing tool may begin to operate in an undesirable manner while wafers processed by the processing tool are waiting in a metrology queue. Thus, the undesirable operation of the processing tool may not be detected by metrology until the wafers in the queue can be provided to the metrology tool, resulting in wafers being processed in an undesirable manner.

Conventional advanced process control systems typically maintain a jeopardy count, at least in part to limit the number of wafers that may be processed by processing tools operating in an undesirable and/or expected manner. The jeopardy count indicates how many wafers have been processed by a tool (or set or tools) since the last metrology was performed on a wafer processed by the tool. For example, a processing tool that has processed 10 wafers since the last wafer processed by the processing tool was provided to a metrology tool would have a jeopardy count of 10. The jeopardy counts may be compared to a critical jeopardy count and processing by the processing tool may be halted if the jeopardy count of the processing tool surpasses the critical jeopardy count. For example, if the critical jeopardy count of a processing tool is 10, then processing by the processing tool may be halted when the processing tool has processed more than 10 wafers since the last metrology check. Jeopardy exceptions such as these may reduce the efficiency of the semiconductor processing system.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the instant invention, an apparatus is provided for scheduling metrology based on a jeopardy count. The apparatus includes at least one processing tool for processing wafers and a controller. The controller is configured to determine a jeopardy count associated with the at least one processing tool and select at least one wafer based upon the jeopardy count, the at least one wafer having been processed by the at least one processing tool.

In one embodiment of the present invention, a method is provided for scheduling metrology based on a jeopardy count. The method includes determining a jeopardy count associated with at least one processing tool and selecting at least one wafer based upon the jeopardy count, the at least one wafer having been processed by the at least one processing tool.

BRIEF DESCRIPTION OF THE DRAWINGS

The invention may be understood by reference to the following description taken in conjunction with the accompanying drawings, in which like reference numerals identify like elements, and in which:

FIG. 2 conceptually illustrates one exemplary embodiment of a first-in-first-out (FIFO) queue;

FIG. 5 conceptually illustrates one embodiment of a jeopardy queue, in accordance with the present invention.

Figure 1:
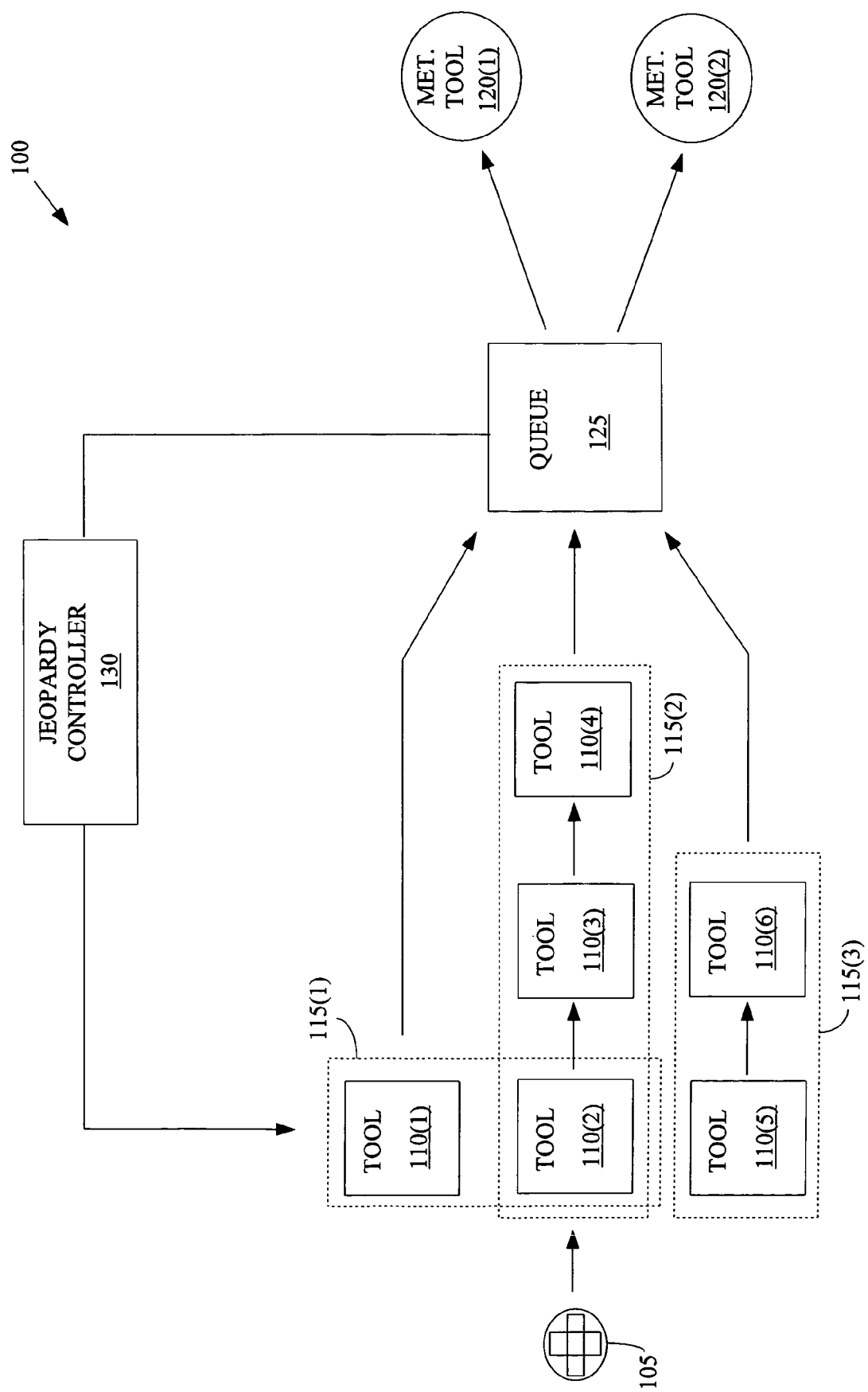
FIG. 1 shows one exemplary embodiment of a system for processing a semiconductor wafer, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to FIG. 1, one exemplary embodiment of a system 100 for processing a semiconductor wafer 105 is shown. Although a single wafer 105 is pictured in FIG. 1, it is to be understood that the wafer 105 is representative of a single wafer as well as a group of wafers, e.g. all or a portion of a wafer lot that may be processed in the system 100. The system 100 includes a plurality of processing tools 110(1-6) that may be used to process one or more wafers 105. In the following discussion, the indices 1-6 will be suppressed when the processing tools are being referred to collectively. The indices 1-6 will only be used to refer to one or more individual processing tools. This numbering convention will also be applied to other elements shown in the figures. The processing tools 110 may include any desirable type of processing tool 110 including, but not limited to, a deposition tool, an etching tool, a lithography tool, an implantation tool, a furnace, a planarization tool and a polishing tool. Although six processing tools 110 are shown in FIG. 1, persons of ordinary skill in the art should appreciate that the present invention is not limited to six processing tools 110. In alternative embodiments, any desirable number of processing tools 110 may be used in the system 100.

In the illustrated embodiment, the processing tools 110 are grouped into three processing sequences. The first processing sequence includes the processing tool 110(1). For example, the processing tool 110(1) may be a deposition tool used to form a layer of material above a surface of the wafer 105. The second processing sequence includes the processing tools 110(2-4). For example, the second processing sequence may include a photolithography tool 110(2) for forming a mask layer above a layer deposited on the surface of the wafer 105, an etching tool 110(3) for etching a portion of the layer through the mask layer, and a deposition tool 110(4) for providing a fill material to etched portions of the layer. The third processing sequence includes the processing tools 110(5-6). For example, the third processing sequence may include a deposition tool 110(5) and a polishing tool 110(6). Persons of ordinary skill in the art should appreciate that the particular processing sequences and/or processing tools 110(1-6) described above are intended to be illustrative and not to limit the present invention.

The processing tools 110(1-6) may also be associated with one or more threads 115(1-3). As used herein, the term "thread" will be understood to refer to a set of context information associated with material, e.g. the wafer 105, processed by portions of the system 100. In one embodiment, the information included in a thread may include the various tools used to process the material, as well as other factual information such as the product being formed, names of operating recipes used by the tools to form the desired product, the technology used to produce the product (e.g. 90 nm technology or 60 nm technology), and the like. A thread may include information regarding a single tool or a plurality of tools, which may or may not be part of the same processing sequence, and tools may be included in more than one thread. In the illustrated embodiment, the thread 115(1) includes the processing tools 110(1-2), the thread 115(2) includes the processing tools 110(2-4), and the thread 115(3) includes the processing tools 110(5-6).

The wafer 105 is provided to one or more metrology tools 120(1-2) after processing by the processing tools 110 in the various processing sequences. Although processing of the wafer 105 may not be complete when the wafer 105 is provided to the metrology tools 120, the metrology performed on the wafer 105 by the metrology tools 120 is generally referred to as "post-processing metrology" because it occurs after at least some processing has been performed on the wafer 105. For example, a first post-processing metrology may be performed after processing by the thread 115(1), a second post-processing metrology may be performed after processing by the thread 115(2), and a third post-processing metrology may be performed after processing by the thread 115(3). Although two metrology tools 120 are shown in FIG. 1, persons of ordinary skill in the art should appreciate that any desirable number of metrology tools 120 may be used in the system 100. The metrology tools 120 may be stand-alone metrology tools 120 or they may be integrated with one or more of the processing tools 110. Exemplary metrology tools 120 include scatterometers, ellipsometers, and the like.

The metrology tools 120 are not always available to perform metrology on the wafer 105. For example, the metrology tools 120 may be performing metrology on a different wafer or they may be down for service. Accordingly, a queue 125 is provided to indicate the order in which the wafers 105 should be provided to the metrology tools 120. The queue 125 may include a device for physically storing, arranging, and/or moving the wafers 105 between the processing tools 110 and the metrology tools 120. In alternative embodiments, the queue 125 may be a stand-alone device or it may be integrated with one or more of the processing tools 110. The queue 125 may also include a list of the wafers 105 that indicates which wafer 105 should be provided to which metrology tool 120. The list may be implemented in software, hardware, or any combination thereof and may be incorporated into any device in the system 100.

FIG. 2 conceptually illustrates one exemplary embodiment of a first-in-first-out (FIFO) queue 200. The FIFO queue 200 includes a list of wafer identifiers (in the column headed "WAFER") and the metrology tool that should be used to perform metrology on the wafer (in the column headed "MT"). Priority in the FIFO queue 200 is determined by the order in which the wafers are provided to the queue 200, e.g. the wafer that has been in the queue 200 for the longest time should be the first one provided when a metrology tool becomes available. In the illustrated embodiment, the wafer identifier includes a string indicative of the processing sequences associated with the wafer. For example wafers processed by the furnace are indicated by the string "FURN," wafers processed by a lithography tool are indicated by the string "LITH," and wafers processed by a planarization tool are indicated by the string "PLAN."

The wafer identifier in the illustrated embodiment also includes the number indicative of a jeopardy count associated with the wafer. The jeopardy count indicates how many wafers have been processed by a tool or thread since the last metrology was performed on a wafer processed by the tool or thread. For example, a processing tool that has processed 10 wafers since the last wafer processed by the processing tool was provided to a metrology tool would have a jeopardy count of 10. Thus, each wafer may be associated with the jeopardy count of the tool or thread at the time the wafer was processed by the tool or thread. For example, the wafer indicated by the wafer identifier "FURN-1" is the first wafer processed by the furnace after metrology was performed on a wafer processed by the furnace. For another example, the wafer indicated by the wafer identifier "LITH-10" is the tenth wafer processed by the lithography tool after metrology was performed on a wafer processed by the lithography tool.

Referring back to FIG. 1, a jeopardy controller 130 is communicatively coupled to the processing tools 110 and the queue 125. The jeopardy controller 130 may determine jeopardy counts associated with the wafer 105, the processing tools 110, and/or the threads 115. The jeopardy controller 130 also includes information indicative of a critical jeopardy count, or a jeopardy count limit, associated with the wafer 105, one or more of the processing tools 110, and/or the threads 115. If a jeopardy count exceeds the corresponding jeopardy count limit, operation of one or more of the processing tools 110 and/or the threads 115 may be suspended or halted until metrology indicates that processing may resume. Halting or suspending processing when a jeopardy count exceeds a jeopardy count limit is referred to herein as a jeopardy exception.

The jeopardy controller 130 can select wafers for metrology based upon the jeopardy count so that the number and/or duration of jeopardy exceptions may be reduced. In one embodiment, the jeopardy controller 130 determines a priority for wafers in the metrology queue based upon the jeopardy count and/or the jeopardy count limit. For example, if a jeopardy count for a thread exceeds the jeopardy count limit for that thread, the jeopardy controller 130 may assign a high priority to any wafers in the queue that have been processed by tools in the thread. For another example, if a jeopardy count for a thread is below the jeopardy count limit for that thread, the jeopardy controller 130 may assign a low or medium priority to wafers in the queue that have been processed by tools in the thread. In one embodiment, the jeopardy controller 130 stores information indicative of the jeopardy counts, the jeopardy count limits, and/or the priorities in a table.

Figure 3:
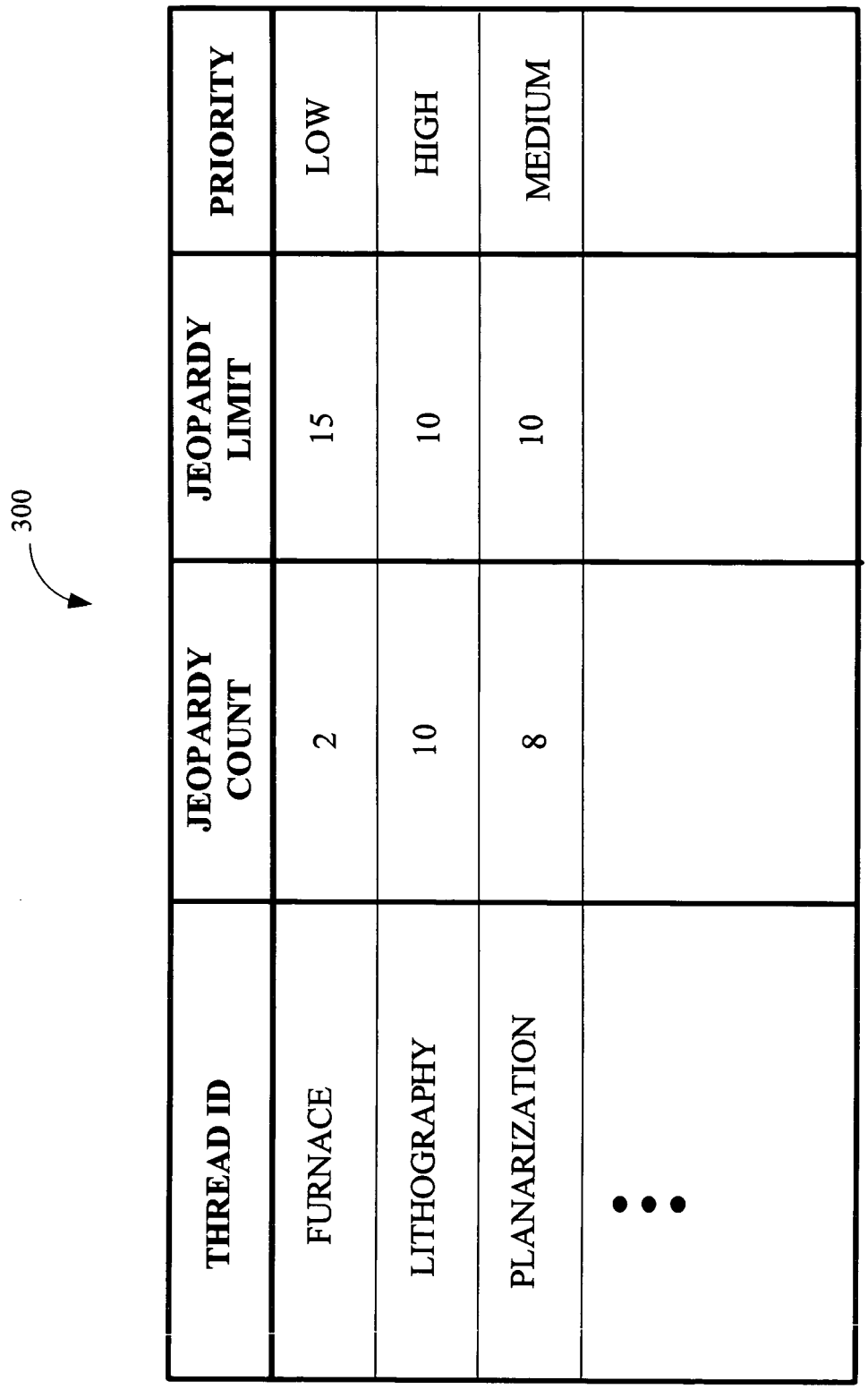
FIG. 3 conceptually illustrates one exemplary embodiment of a table including information indicative of jeopardy counts, jeopardy count limits, and priorities associated with one or more threads, in accordance with the present invention.

FIG. 3 conceptually illustrates one exemplary embodiment of a table 300 including information indicative of jeopardy counts, jeopardy count limits, and priorities associated with one or more threads. The table 300 includes a column including thread identifiers (THREAD ID), a column containing the jeopardy count associated with the thread identifier, a column including the jeopardy limit associated with the thread identifier, and a column indicating the assigned priority. In the illustrated embodiment, the thread associated with a furnace has a jeopardy count of 2 and a jeopardy limit of 15. Accordingly, the furnace thread has been assigned a low priority for metrology. The thread associated with a lithography tool has a jeopardy count of 10 that is equal to the jeopardy limit of 10, indicating that a jeopardy exception has occurred or may occur soon. Accordingly, wafers associated with the lithography thread are assigned a high priority for metrology. The thread associated with a planarization tool has a jeopardy count of 8 that is approaching the jeopardy limit of 10. Accordingly, wafers associated with the planarization thread are assigned a medium priority.

Figure 4:
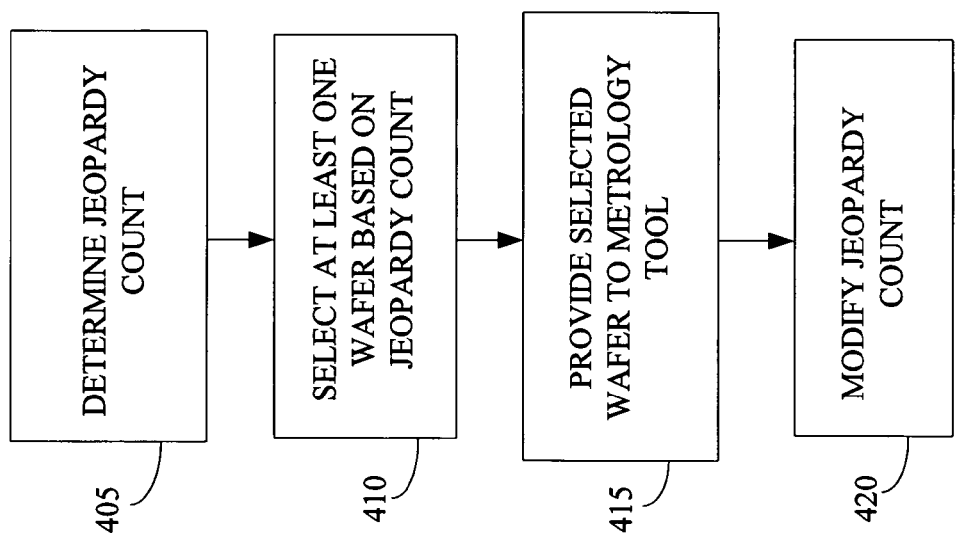
FIG. 4 conceptually illustrates one exemplary embodiment of a method for scheduling metrology based on a jeopardy count, in accordance with the present invention.

FIG. 4 conceptually illustrates one exemplary embodiment of a method 400 for scheduling metrology based on a jeopardy count. A jeopardy count is determined (at 405). As discussed above, the jeopardy count may be associated with a wafer, a tool, a thread, or any desirable combination thereof. One or more wafers are then selected (at 410) for metrology based upon the jeopardy count. In one embodiment, selecting (at 410) the one or more wafers comprises determining one or more priorities for wafers in a queue. The queue may then be ordered to reflect the determined priorities. In various alternative embodiments, reordering the queue may include sorting items in a list based upon the priorities, physically rearranging wafers within a device, or a combination thereof.

FIG. 5 conceptually illustrates one embodiment of a jeopardy queue 500. In the illustrated embodiment, the lithography thread has been given the highest priority because the jeopardy count is equal to the jeopardy limit for a lithography thread. Accordingly, the wafers associated with the lithography thread are given the highest priority for the metrology tools. Furthermore, the wafer having the highest associated jeopardy count (LITH-10) has been given the highest priority among the wafers associated with the lithography thread. Giving priority to wafers having high associated jeopardy counts may be advantageous because the jeopardy count associated with the corresponding thread may be reduced by a larger amount if metrology of this wafer indicates that the tool is operating in a desired and/or expected manner. Accordingly, the wafer LITH-10 is moved to the top of the jeopardy queue 500.

Wafers associated with the planarization thread, which has been given a medium priority for metrology, may follow the wafer associated with the lithography thread in the jeopardy queue 500. Wafers associated with the furnace thread, which has been given a low priority for metrology, may then follow the wafers associated with the planarization thread in the jeopardy queue 500. In one embodiment, all of the wafers in the jeopardy queue 500 may eventually be provided to a metrology tool. However, in alternative embodiments, one or more wafers may be deleted from the jeopardy queue 500. For example, if metrology of the wafer LITH-10 indicates that the lithography thread is operating in the desired and/or expected manner, then wafers that have a lower jeopardy count (e.g. LITH-1) may be removed from the jeopardy queue 500.

Referring back to FIG. 4, one or more of the selected wafers are provided (at 415) to one or more of the metrology tools based on the jeopardy queue. Providing (at 415) the selected wafers to the metrology tool may include selecting a metrology tool from a group of metrology tools based upon availability of the metrology tools and/or a sampling plan associated with each of the metrology tools. Metrology may be performed on the selected wafers by the metrology tools. For example, one or more parameters associated with the wafers, such as thicknesses, critical dimensions, overlay/alignment errors, and the like, may be measured by the metrology tool.

The jeopardy count associated with the wafers, the threads, the tools, or a combination thereof, may be modified (at 420) based on the metrology. For example, if the metrology performed on the wafer LITH-10 indicates that the lithography thread is operating in the desired and/or expected manner and the wafer LITH-10 was the last wafer processed by the lithography thread, then the associated jeopardy count may be reduced to zero. The measured parameters may be used to determine whether the lithography thread is operating in the desired and/or expected manner. For example, if a measured critical dimension is within a predetermined tolerance, the lithography thread may be operating in the desired and/or expected manner.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining a jeopardy count associated with at least one processing tool; and
   providing at least one wafer to a metrology tool based upon the jeopardy count, the at least one wafer having been processed by the at least one processing tool, wherein providing the at least one wafer comprises determining a priority associated with the at least one wafer based on the jeopardy count associated with the at least one wafer.

2. The method of claim 1, wherein determining the jeopardy count associated with the at least one processing tool comprises determining a jeopardy count associated with at least one thread associated with the at least one processing tool.

3. The method of claim 2, wherein determining the jeopardy count associated with the at least one thread comprises determining a jeopardy count associated with at least one thread associated with a plurality of processing tools.

4. The method of claim 2, wherein determining the jeopardy count associated with the at least one thread comprises associating the at least one wafer with a thread identifier indicative of the at least one thread.

5. The method of claim 4, wherein determining the jeopardy count associated with the at least one thread comprises providing a table indicating the jeopardy count and the thread identifier associated with each thread.

6. The method of claim 1, wherein providing the at least one wafer comprises selecting the at least one wafer from a plurality of wafers based upon a jeopardy count associated with each of the plurality of wafers.

7. The method of claim 1, wherein determining the priority comprises comparing the jeopardy count associated with the at least one wafer to a jeopardy count limit.

8. The method of claim 1, wherein providing the at least one wafer to the metrology tool comprises selecting the metrology tool from a group of metrology tools.

9. The method of claim 8, wherein selecting the metrology tool from the group of metrology tools comprises selecting the metrology tool from the group of metrology tools based upon at least one of an availability of each of the metrology tools and a sampling plan associated with each of the metrology tools.

10. The method of claim 1, further comprising measuring at least one parameter associated with the at least one wafer using the metrology tool.

11. The method of claim 10, further comprising modifying the jeopardy count based upon the at least one measured parameter.

12. An apparatus, comprising:
means for determining a jeopardy count associated with at least one processing tool; and
means for providing at least one wafer to a metrology tool based upon the jeopardy count, the at least one wafer having been processed by the at least one processing tool, wherein providing the at least one wafer comprises determining a priority associated with the at least one wafer based on the jeopardy count associated with the at least one wafer.

13. An apparatus, comprising:
at least one processing tool for processing wafers;
at least one metrology tool; and
a controller configured to:
determine a jeopardy count associated with the at least one processing tool; and
provide at least one wafer to said at least one metrology tool based upon the jeopardy count, the at least one wafer having been processed by the at least one processing tool, wherein the controller is configured to determine a priority associated with the at least one wafer based on the jeopardy count associated with the at least one wafer.

14. The apparatus of claim 13, wherein the at least one processing tool is associated with at least one thread.

15. The apparatus of claim 14, wherein the controller is configured to determine a jeopardy count associated with at least one thread.

16. The apparatus of claim 14, wherein the controller is configured to associate the at least one wafer with a thread identifier indicative of the at least one thread.

17. The apparatus of claim 16, wherein the controller is configured to provide a table indicating the jeopardy count and the thread identifier associated with each thread.

18. The apparatus of claim 13, wherein the controller is configured to select the at least one wafer from a plurality of wafers based upon a plurality of jeopardy counts associated with each of the plurality of wafers.

19. The apparatus of claim 13, wherein the controller is configured to compare the jeopardy count associated with the at least one wafer to a critical jeopardy count.

20. The apparatus of claim 13, wherein said at least one metrology tool is configured to measure at least one parameter of the at least one wafer.

21. The apparatus of claim 20, wherein said at least one metrology tool comprises a plurality of metrology tools, and wherein the controller is configured to select said at least one metrology tool from the plurality of metrology tools.

22. The apparatus of claim 21, wherein the controller is configured to select the at least one metrology tool from the plurality of metrology tools based upon at least one of an availability of each of the metrology tools and a sampling plan associated with each of the metrology tools.

23. The apparatus of claim 20, wherein the controller is configured to modify the jeopardy count based upon the at least one measured parameter.

* * * * *